Dec. 25, 1956  M. DORN ET AL  2,775,220
ILLUMINATION OF INDICATING APPARATUS
Filed June 25, 1954  2 Sheets-Sheet 1
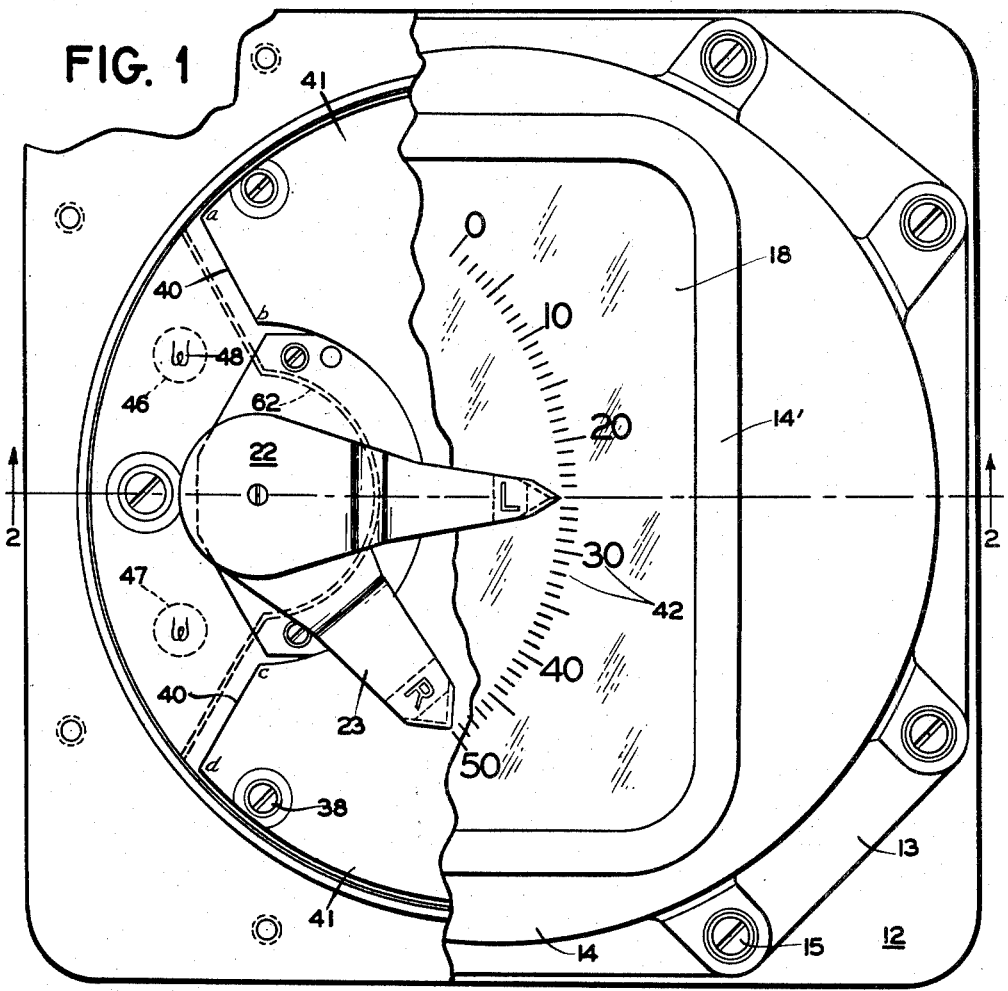
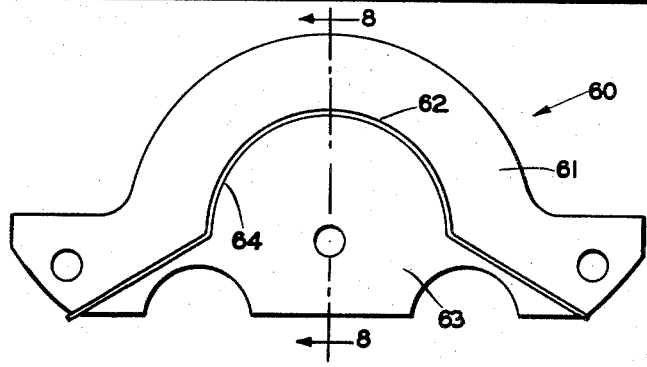
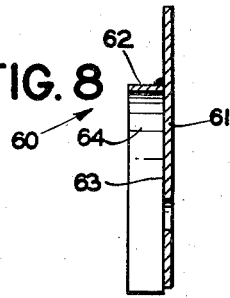
INVENTORS
MAXWELL DORN
WERNER ROSENBAUM
BY *Tyler S Roundy*
ATTORNEY Dec. 25, 1956   M. DORN ET AL   2,775,220
ILLUMINATION OF INDICATING APPARATUS
Filed June 25, 1954   2 Sheets-Sheet 2
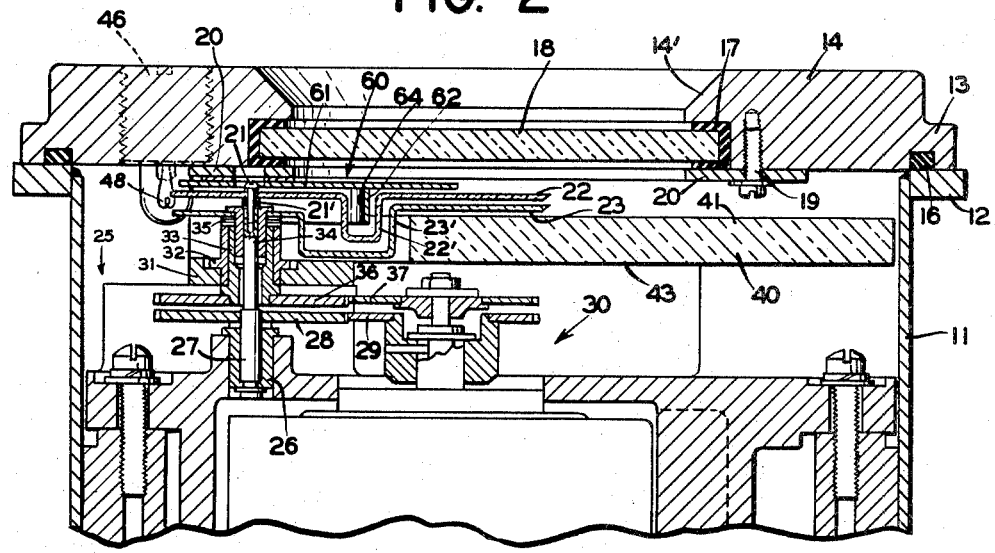
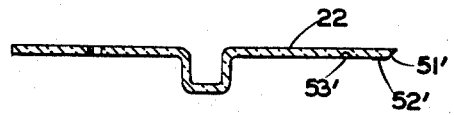
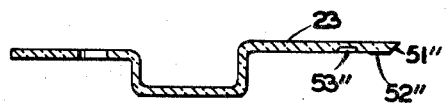
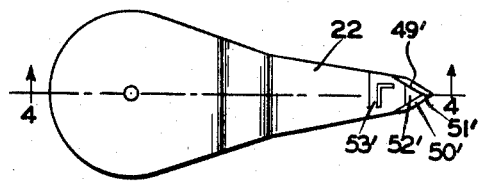
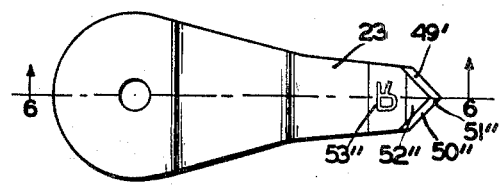
INVENTORS
MAXWELL DORN
WERNER ROSENBAUM
BY Tyler S Roundy
ATTORNEY

2,775,220

ILLUMINATION OF INDICATING APPARATUS

Maxwell Dorn, Jersey City, N. J., and Werner Rosenbaum, New York, N. Y., assignors to Bendix Aviation Corporation, Teterboro, N. J., a corporation of Delaware Application June 25, 1954, Serial No. 439,445

18 Claims. (Cl. 116—129)

The present invention relates to indicating apparatus and particularly to the illumination of indicating apparatus. The invention applies especially, but not exclusively, to arrangements utilizing light-conducting indicator or pointer members.

It is an object of the present invention to provide an improved movable indicator or pointer member.

It is another object of the invention to provide a unique indicator and light shield assembly.

It is another object of the invention to provide an indirectly lighted indicator or pointer arrangement wherein the movable indicator or pointer is capable of intense illumination particularly at the tip end while at the same time stray light and glare are substantially eliminated.

It is another object of the invention to provide an indirectly lighted indicator or pointer arrangement utilizing a pair of elongated movable indicator or pointer members of light-transmitting material wherein for all positions of the members there is obtained illumination of a desired uniform intensity for selected portions of the members and wherein parallax is minimized.

The above and other objects and features of the present invention will become apparent hereinafter from a consideration of the detailed description which follows taken together with the accompanying drawings wherein one embodiment of the invention is illustrated by way of example. In the drawings wherein like reference characters refer to like elements throughout the several views, Fig. 1 is a front view of an indicating device embodying the present invention with a portion of the cover assembly broken away to show the pair of pointers cooperating with the dial and the position of the lamps and shield;

Fig. 2 is a cross-sectional view taken along the line 2—2 of Fig. 1.

Fig. 3 is a front view of the outer pointer member of Figs. 1 and 2, while Fig. 4 is a side sectional view taken along the line 4—4 of Fig. 3;

Fig. 5 is a front view of the inner pointer member of Figs. 1 and 2, while Fig. 6 is a side sectional view taken along the line 6—6 of Fig. 5;

Fig. 7 is a front view of the light shield and pointer mask assembly; and

Fig. 8 is a cross-sectional view taken along the line 8—8 of Fig. 7.

Turning to Figs. 1 and 2, there is illustrated a dual-pointer indicating instrument suitable for use not only in daylight but also in a darkened environment requiring so-called "night vision" and hence requiring indirect illumination accompanied by an absolute minimum of stray light and glare. A housing 11 has its flange portion 12 secured to flange portions 13 of a cover member 14 by means of screws 15. A sealing gasket 16 is sandwiched between the opposed flange portions. Fitted within a recess in the cover member is a rubber gasket 17 which surrounds the rim of a transparent cover glass or window 18. The cover member has a beveled surface 14' serving as a frame for window 18. Secured to the lower portion of the cover member by means of screws 19 is a metal plate 20 having a large central aperture so as not to obscure the ends of indicator members 22 and 23.

Secured to the sides of the housing is a support assembly indicated generally at 25. Supported by the assembly is a bushing 26 within which a shaft 27 is disposed for rotation. The outer end of shaft 27 is threaded to receive a screw 21 which passes through an aperture in the pointer 22 and through a selected number of thin washers or shims 21' so as to secure the outer pointer to shaft 27. Shaft 27 is adapted for rotation by gears 28 and 29 which in turn are angularly displaced by a section of a driving mechanism unit 30 which may be an electrical inductive follow-up or synchro device controlled by signals from a remote electrical transmitter device. Secured to the support assembly is a member 31 mounting a bushing 32 within which a hollow shaft 33 is disposed for rotation. The hollow shaft 33 is threaded internally to receive a hollow screw 34. Shaft 27 and hollow screw 34 pass through an aperture in the inner pointer 23. Sandwiched between a selected number of thin washers or shims 35 and the outer flange portion of the hollow screw 34 is the tail-end portion of the inner pointer 23 so that the latter is made to rotate with the hollow screw 34 and hollow shaft 33 which in turn are angularly displaced by gears 36 and 37 driven by another driving mechanism section which may be a second electrical follow-up or synchro device controlled by the signals developed in a second remote electrical transmitter.

Carried by the support assembly and secured by screws 38 is a dial 40 of light transmitting plastic material such as methyl methacrylate, more commonly known as "Lucite" or "Plexiglas." Dial 40 is of cylindrical shape except for a removed section defined by the straight edges a—b and c—d and the arcuate edge b—c. The outer surface 41 of the dial and the circumferential edge a—d may be covered by a layer of white paint which in turn is covered by a layer of opaque paint or printer's ink, the dial indicia 42 being cut out of the opaque layer and the inner surface of the dial being highly polished. Alternatively, the indicia 42 may be cut or engraved in the outer surface 41 of the dial and the resulting recesses filled with white paint, the remaining flat surface 41 being covered with a layer of opaque paint or printer's ink which may be applied by a roller. In either construction, when light rays are transmitted through the dial from the edge the indicia is seen as white or colored light against a dark contrasting background provided by the opaque layer.

The pointer members 22 and 23 are composed of a light-transmitting plastic material such as "Lucite" or "Plexiglas" and have their surfaces and edges highly polished except as hereinafter noted. As indicated in Figs. 1 and 2, a pair of conventional lamps 46 and 47 are threaded through the front end of the cover member 14 by means of a screw-driver inserted in a slot provided in the end of each lamp, the lamps being energized by means (not shown) within the housing 11. The lamps are located adjacent to the tail-end portions of the pointers and flank the left and right-hand edges of the pointers, each lamp having its filament 48 located midway between the planes of the tail-end portions, so that substantially the same amount of light enters the side edges and tail-end portion of each pointer for all of its angular positions. By internal reflection the light rays are transmitted through each pointer to its tip-end portion.

As seen best in Figs. 3–6, the pointers 22 and 23 have at their tip ends a pair of beveled bottom surfaces 49' and 50' and 49" and 50", respectively, which converge on each other to form a tapered bottom edge or vertex line 51' and 51", respectively. These beveled bottom surfaces and an adjacent triangularly shaped bottom surface 52' and 52", respectively, are coated with a layer of white paint so that light rays transmitted through the pointers strike the white-painted surfaces and are reflected outwardly toward the observer to present against the contrasting dark dial surface an intensely illuminated index mark which cooperates with the graduations 42 on the dial to give a precise reading for each pointer at its various angular positions.

In accordance with the present invention there is cut or engraved into the bottom or inner surface of the tip-end portion of each pointer an indicium 53' and 53", respectively, in the form of reference letters "L" and "R", whereby each pointer may be identified. If desired, reference numerals or other identifying characters or symbols may be employed rather than reference letters. The resulting recesses due to the engraving are filled with white paint and the surrounding flat bottom surface 54' and 54", respectively, are covered with a layer of opaque paint or black printer's ink which may be applied by a roller. Some of the light rays transmitted through each pointer strike the engraved letter filled with white paint and are reflected outwardly toward the observer to present an intensely illuminated letter against a contrasting dark background provided by the surrounding opaque layers of the pointer and dial.

In order to minimize parallax or angle of observation error due to depth of displacement between the dial and each pointer, the pointers are preferably manufactured from thin material and the number of shims or spacers 21' and 34 are chosen so as to provide the smallest possible space between the pointers and between each pointer and the dial. In one construction according to the present invention the pointers each had a thickness of 1/16 inch and a separation distance between the tip-end portions of the pointers of 0.010 inch, the separation distance between the inner pointer 23 and the outer dial surface 41 being 0.010.

In order to prevent glare caused by stray light rays passing between and along the pointers toward the tip end and striking the dial to reflect into the eyes of the observer, each pointer in accordance with the present invention is provided with a re-entrant portion in the form of a U-shaped bend portion 22' and 23', respectively, which is adjacent to the arcuate dial edge b—c and which extends inwardly in a direction substantially normal to the plane of the outer dial surface 41. It will be noted that the bend portions are dimensioned so that the bend portion of the outer pointer passes between the walls of the bend portion of the inner pointer with sufficient clearance for all angular positions of the pointers. By such construction substantially no light rays are permitted to pass between and along the pointers toward the tip ends.

In accordance with another feature of the invention, there is provided a unique shield assembly, indicated generally at 60, including means for masking all but the tip-end portions of the pointers and means for preventing glare due to light rays passing along the outer surface of the outer pointer toward the tip end and striking the dial to reflect into the eyes of the observer. As seen best in Figs. 2, 7 and 8 the shield assembly comprises a plate 61 extending parallel to the dial surface to serve as a mask for the pointers and an arcuate shield member 62 soldered or otherwise secured to the plate and extending inwardly part way into the depression between the walls of the bend 22' in the outer pointer. In this manner light rays are prevented from passing along the outer surface of pointer 22 between its bend portion 22' and its tip-end portion. Sufficient distance is maintained between the inner end of shield 62 and the plane of the inner dial surface 43 so that adequate light may pass from the lamps into dial edges a—b, b—c, and c—d for transmission through the dial to illuminate the indicia 42.

The shield assembly 60 has its plate 61 secured to the cover member 14 by means such as screws which have been omitted for the sake of clarity. In the construction previously detailed where the separation between the tip-end portions of the pointers was 0.010 inch, a separation between plate 60 and pointer 22 of 0.010 inch proved satisfactory. The portion 63 of the inner surface of plate 60 bounded by shield 62 and the surface 64 of shield 62 facing the lamps are coated with white paint, as are surrounding housing and support surfaces in the vicinity of the lamps so that the light rays as they are emitted from the lamps are reflected back and forth whereby the filaments are no longer the most intense sources of light.

Colored light filters may be provided in front of the lamp bulbs if desired. Also, it is to be understood that the engraved paint-filled symbol and opaque layer may be provided on the outer rather than the inner surface of each pointer if desired. Moreover, one or more additional lamps may be provided at the opposite end of the dial remote from lamps 46 and 47 to serve as a separate light source for the dial, in which case the edges a—b, b—c and c—d may be covered with an opaque layer. Such additional lamps may be provided adjacent to the edge of the dial or may be inserted in apertures provided in the dial. Also, separate dials may be provided for each of the pointers 22 and 23, if desired.

Although one specific embodiment of the invention has been illustrated and described in detail by way of example, it is to be expressly understood that the invention is not limited thereto. Various changes may be made in the shape, size and design of the pointers and dial without departing from the spirit and scope of the appended claims as will now be understood by those skilled in the art.

What is claimed is:

1. In indicating apparatus, a dial, a pair of adjacent relatively movable elongated indicator members composed of material which conducts radiant energy, and radiant energy generating means located adjacent to one end of each of said indicator members to direct radiant energy into said one end of each member so that radiant energy passes through said indicator members to the opposite ends thereof to illuminate said opposite ends.

2. Apparatus according to claim 1 wherein there is provided a differently shaped indicium on each of said indicator members.

3. In indicating apparatus, a dial, two light-conducting relatively rotatable elongated indicator members mounted one in front of the other for rotation with respect to said dial, and lamp means located adjacent to the tail-end portions of said indicator members with the light-emitting portion thereof located substantially midway between the planes of said tail-end portions to direct light into said tail-end portions so that light passes through said indicator members to the tip-end portions hereof to illuminate said tip-end portions.

4. In indicating apparatus, a dial, a pair of light-conducting relatively rotatable elongated indicator members mounted one in front of the other for rotation with respect to said dial, each of said members having a different identifying symbol provided thereon, and means for directing light into the tail ends and sides of said indicator members so that light is transmitted through said indicator members to the tip-end portions thereof to illuminate said tip-end portions.

5. Apparatus according to claim 4 wherein the tip-end portion of each indicator member has an index mark and an adjacent layer of opaque material having an indicium opening therein which forms the outline of said symbol.

6. Apparatus according to claim 5 wherein each indicator member has its surface area directly opposite its indicium opening engraved to also form the outline of said symbol.

7. Apparatus according to claim 6 wherein said index mark for each indicator member is provided by a pair of beveled bottom surfaces on each member which converge to form a vertex and which have a layer of white paint thereon to receive light rays transmitted through the member and to reflect said light rays to the top of the member, the opaque layer and engraved surface of each member being located on the bottom thereof, the recesses of the engraved portion of each member containing a quantity of white paint to receive other light rays transmitted through the member and to reflect said other light rays to the top of the member.

8. In indicating apparatus provided with a dial and a source of light, a pointer for the dial comprising an elongated light-conducting member, said member having a surface area intermediate the ends thereof which is engraved to form an identifying symbol, a quantity of white paint disposed in the engraved portions of said member, and a layer of opaque material covering said surface portion except for the engraved portions thereof to form a contrasting background for said symbol.

9. In indicating apparatus provided with a dial and a source of light, a pointer for the dial comprising an elongated light-transmitting member, the tip-end portion of said member having a pair of beveled bottom surfaces which converge to form a vertex and which have a layer of light-reflecting material thereon to receive light rays transmitted through said member and to reflect said light rays toward the top of said member to provide an illuminated index point for said member, said member having a bottom surface spaced from said beveled surfaces and engraved to form the outline of a reference character, a quantity of light-reflecting material disposed in the engraved portions to receive other light rays transmitted through said member and to reflect said other light rays toward the top of said member, and a layer of opaque material covering said surface portion except for the engraved portion thereof to form a contrasting background for the illuminated reference character.

10. In indicating apparatus, a light-conducting dial having indicia thereon, a pair of adjacent light-conducting relatively movable elongated indicator members for said dial, means for producing movement of said indicator members, and lamp means positioned adjacent to an edge of said dial to direct light rays therein for transmission to said indicia and positioned adjacent to one end of each of said indicator members to direct other light rays into said one end of each member so that said other light rays pass to the opposite ends thereof to illuminate said opposite ends.

11. In indicating apparatus, a light-conducting dial having indicia thereon, a pair of elongated light-conducting relatively rotatable elongated indicator members mounted one in front of the other for rotation with respect to said dial, each of said members having a different identifying symbol provided on a portion thereof intermediate between the ends thereof, and lamp means positioned adjacent to an edge of said dial to direct light rays therein for transmission therethrough to said indicia and positioned adjacent to the tail ends of said members to direct other light rays into the tail ends and sides of said members so that said other light rays are transmitted through said members to illuminate the portions provided with said symbols.

12. In indicating apparatus, a dial, an elongated movable indicator member for said dial, means for directing light rays along the tail-end portion of said member, said member having a re-entrant portion intermediate between the ends thereof and extending inwardly in a direction substantially perpendicular to the face of said dial, and a shield member spaced from said indicator member and extending inwardly into said re-entrant portion to prevent the passage of light rays along the outer surface of said indicator member to the tip-end portion thereof, whereby glare caused by said last-mentioned light rays otherwise striking the dial is prevented.

13. In indicating apparatus, a pair of elongated indicator members disposed one in front of the other, means for rotating each member with respect to the other, each of said members having a re-entrant portion located between the axis of rotation and one end of the member, said re-entrant portions extending in a direction generally normal to the longitudinal axis of the member and to the direction of movement thereof, the re-entrant portion of the outer member having a shape which permits movement thereof in spaced relation between the walls of the re-entrant portion of the inner member.

14. In indicating apparatus, a dial, an elongated movable light-conducting indicator member for said dial, means for directing light rays into the tail-end portion of said member so that said light rays pass through said member to the tip end thereof, said member having a re-entrant portion intermediate between the ends thereof and extending inwardly in a direction substantially perpendicular to the face of said dial, and a shield member spaced from said indicator member and extending inwardly into said re-entrant portion to prevent the passage of light rays along the outer surface of said indicator member to the tip-end portion thereof, whereby glare caused by said last-mentioned light rays otherwise striking the dial is prevented.

15. In indicating apparatus, a pair of elongated light-conducting indicator members disposed one in front of the other, means for rotating each member with respect to the other, means for directing light rays into the tail-end portions of said members so that light is transmitted through said members to the tip-end portions thereof, each of said members having a re-entrant portion located between the axis of rotation and the tip end of the member to eliminate substantially the passage of light rays between said members along the portion of each member between its re-entrant portion and its tip-end portion, said re-entrant portions extending in a direction generally normal to the longitudinal axis of the member and to the direction of movement thereof, the re-entrant portion of the outer member having a shape which permits movement thereof in spaced relation between the walls of the re-entrant portion of the inner member.

16. In indicating apparatus, a dial, a pair of elongated light-conducting indicator members disposed one in front of the other for rotation with respect to said dial, means for rotating each member with respect to the other, lamp means positioned adjacent to the tail-end portions of said members for directing light rays into said tail-end portions so that said light rays are transmitted through said members to the tip-end portions thereof, each of said members having a U-shaped bend portion located between the axis of rotation and the tip end of the member and extending inwardly in a direction substantially perpendicular to said dial to eliminate substantially the passage of light rays between said members along the portion of each member between its bend portion and its tip-end portion, the bend portion of the outer member being dimensioned to permit movement thereof in spaced relation between the walls of the bend portion of the inner member, and an arcuate shield member extending inwardly into the depression formed by the bend portion of said outer member to prevent the passage of light rays along the outer surface of said outer member between said shield member and the tip-end portion of said outer member, whereby glare due to said last-mentioned light rays otherwise striking said dial is prevented.

17. In indicating apparatus, a light-conducting dial having indicia on a surface thereof, a pair of elongated light-conducting indicator members mounted one in front of the other for rotation with respect to said dial, means for rotating each member with respect to the other and with respect to the dial, each of said members having a different identifying symbol provided on a portion thereof intermediate between the ends thereof, lamp means positioned adjacent to an edge of said dial to direct light rays therein for transmission therethrough to said indicia and positioned adjacent to the tail ends of said members to direct other light rays into the tail ends and sides of said members so that said other light rays are transmitted through said members to the portions provided with said symbols and to the tip ends of said members, each of said members having a U-shaped bend portion located adjacent to the edge of the dial between the axis of rotation and the tip end of the member and extending inwardly in a direction generally perpendicular to said dial surface to eliminate substantially the passage of light rays between said members along the portion of each member between its bend portion and its tip-end portion, and an arcuate shield member extending inwardly into the depression formed by the bend portion of the outer member to prevent the passage of light rays along the outer surface of said outer member between said shield member and the tip-end portion of said outer member.

18. In indicating apparatus, a light conducting dial having indicia on a surface thereof, a pair of elongated light-conducting pointer members mounted one in front of the other for rotation with respect to said dial, means for rotating each member with respect to the other and with respect to the dial, each of said members having a different identifying symbol provided on a portion thereof intermediate between the ends thereof, each of said members having an index mark at its tip-end portion and an adjacent layer of opaque material provided with an indicium opening therein which forms the outline of said symbol, each member having its surface area directly underneath its indicium opening engraved to also form the outline of said symbol, the recesses of the engraved portion of each member containing a quantity of white paint to receive and re-direct outwardly toward the observer light rays transmitted through the member, at least one lamp positioned adjacent to an edge of said dial to direct light rays therein for transmission therethrough to said indicia, said lamp being positioned adjacent to the tail-end portions of said members and having its filament located substantially midway between the planes of said tail-end portions to direct other light rays into the tail-end portions and side edges of said members so that said other light rays are transmitted through said members to the engraved portions and tip-end portions of said members, each of said members having a U-shaped bend portion located adjacent to the edge of the dial between the axis of rotation and the tip end of the member and extending inwardly in a direction generally perpendicular to said dial surface to eliminate substantially the passage of light rays between said members along the portion of each member between its bend portion and its tip-end portion, and an arcuate shield member extending inwardly into the depression formed by the bend portion of the outer member to prevent the passage of light rays along the outer surface of said outer member between said shield member and the tip-end portion of said outer member.

References Cited in the file of this patent
UNITED STATES PATENTS

| | | |
|---|---|---|
| 302,908 | Haight | Aug. 5, 1884 |
| 1,917,079 | Adams | July 4, 1933 |
| 2,278,520 | Klein | Apr. 7, 1942 |
| 2,290,278 | Failla | July 21, 1942 |
| 2,410,064 | Hardesty | Oct. 29, 1946 |